United States Patent [19]

Gibb

[11] 4,440,989

[45] Apr. 3, 1984

[54] KEY TELEPHONE AREA VOICE PAGING CIRCUIT AND METHOD

[75] Inventor: William D. Gibb, Belleville, Canada

[73] Assignee: Northern Telecom Limited, Montreal, Canada

[21] Appl. No.: 360,184

[22] Filed: Mar. 22, 1982

[51] Int. Cl.³ .................... H04M 1/72; H04M 1/60
[52] U.S. Cl. .................................................. 179/99 P
[58] Field of Search .............. 179/99 P, 99 A, 18 BF, 179/1 H, 1 HF

[56] References Cited

U.S. PATENT DOCUMENTS 4,037,059 7/1977 Stine .................................. 179/99 P Primary Examiner—Stafford D. Schreyer
Attorney, Agent, or Firm—J. E. Moorhouse

[57] ABSTRACT

An area voice paging feature is provided in a key telephone system wherein key telephone station sets each have a loudspeaker circuit responsive to a d.c. control signal, on an associated signalling path, to audibly reproduce voice band signals superimposed on the d.c. control signal. A page control interface circuit generates a page control signal in response to receiving the d.c. control signal, when the d.c. control signal is directed to the interface circuit on one of the signalling paths, and generates a d.c. biased voltage signal having an a.c. component corresponding to the voice band signals. Page switches each have an output connected in common with a predetermined respective one of the signalling paths and are each responsive to the page control signal to couple the d.c. biased voltage signal to the respective signalling path. Each loudspeaker circuit, in a group as selected by the page switches, receives the d.c. biased voltage signal and produces and audible signal corresponding to the a.c. component. In the case where one of the signalling paths is already in use, this is indicated by the presence of the d.c. control signal on the signalling path. In this event, a logic circuit in the page switch senses the prior presence of the d.c. control signal and the d.c, biased voltage signal is prevented from being coupled to the already occupied signalling path.

6 Claims, 3 Drawing Figures

KEY TELEPHONE AREA VOICE PAGING CIRCUIT AND METHOD

The invention is in the field of key telephone systems and more particularly relates to providing for voice paging of plural key telephone station sets in a key telephone system.

One of the features typically characterizing a key telephone system is an intercom feature. The intercom feature permits users of key telephone station sets to be in direct communication with one another by way of an intercom path provided by a local intercom lead pair. The local intercom lead pair is routed through the key telephone system so as to be accessible by various of the key telephone station sets as required. The intercom path is separate from any central office facility and includes associated circuitry for generating and routing appropriate signalling tones in response to supervisory states of the intercom lead pair and in response to dialling signals. Intercom call ringing signals are typically generated in the form of tone signals audibly produceable by a loudspeaker in the called key telephone station set. In one arrangement a calling party is optionally permitted to voice page the called party. This feature is provided by means of a switch for connecting the local intercom pair to the associated routing circuitry, such that a one-way voice path is established from the key telephone station set transmitter of the calling party to the loudspeaker in the called party station set, whereby the loudspeaker reproduces the calling party's voice. The voice paging feature has proven to be very popular in key telephone systems. It is particularly useful in a situation where several persons normally share a key telephone station set at one location. In this situation the person to whom the intercom call is being directed is immediately identified without one of the several persons first having to answer the intercom call to determine the identity of the called person.

A key telephone system including the intercom voice paging feature is described in U.S. Pat. No. 4,293,740 issued on Oct. 6, 1981 to Donald Edwin Clement and myself. An advantage of this system is that the voice paging is localized at the station set so as to leave persons beyond the immediate area substantiallly undisturbed. One disadvantage of this system is that if a paged person is out of hearing range of the station set, the person will not likely be made aware of the intercom call. However if an area paging feature is provided, the calling party has the option of paging the called person over the wider area and so alert that person to the call. In one arrangement of an area paging system, one or more area paging loudspeakers, separate from any of the key telephone station sets, are driven with substantial power to effect voice paging over a wide area. If only one or two such loudspeakers are used, voice paging sound volume sufficient to be adequately perceptable over the whole area, is often extremely uncomfortable for persons in the immediate area of the loudspeaker. This problem can be overcome by using many loudspeakers distributed throughout the area. In any case the provision of wide area voice paging as described above is a substantial expense in addition to the cost of the key telephone system.

It is an object of the invention to provide an area voice paging circuit for a key telephone system wherein a network with signalling ports is used to transmit a.c. voice band signals superimposed on a d.c. control signal to loudspeaker circuits each residing in in an associated key telephone station set, each loudspeaker circuit being selectable via one of the signalling ports.

In accordance with the invention, the area voice paging circuit includes a page control interface circuit for generating a page signal in response to receipt of a d.c. control signal via a signalling switch network, and for generating d.c. biased voltage signals corresponding to the signals received via the signalling switch network. A plurality of page switches each have an output terminal connected in common with a respective one of a plurality of signalling ports. The page switches are each responsive to an assertion of the page signal from the page control interface circuit, for coupling the d.c. biased voltage signal from the control interface circuit to a respective one of the signalling ports, for use in a loudspeaker circuit in a key telephone station set connected to the signalling port.

In accordance with one aspect of the invention, each page switch is provided by a transmission gating circuit. The transmission gating circuit comprises a transmission gate having input, output and control terminals. The transmission gating circuit is responsive to a d.c. voltage at the control terminal to provide a transmission path between the input and output terminals. A logic circuit is connected between the output terminal, the control terminal and a control port. The logic circuit is responsive to a d.c. control voltage being asserted at the control port to pass the d.c. control voltage to the control terminal, except in an instant where a d.c. voltage is already present at the output terminal. Thus in the presence of a d.c. voltage being applied at the output terminal from another source, a transmission path is not provided between the input and output terminals.

The invention also provides a method for performing an area page across a group of loudspeaker circuit equipped key telephone station sets in a key telephone system, wherein individual ones of the loudspeaker circuits are activated in response to a predetermined d.c. signal supplied on respective ones of signalling leads. The method comprises the step of applying area page signals to a group of transmission gates, the area page signal comprising a voice band signal superimposed on a d.c. control signal. One of a busy and an idle state is determined for each associated signalling lead. A page control signal is generated to cause each of the transmission gates to pass the area page signals to each respective signalling lead. In the instance of the busy state being determined on one of the signalling leads prior to generation of the page control signal, the associated transmission gate is maintained at a higher impedance than that required to pass the area page signal. In the instance of the idle state being determined, the transmission gate impedance is reduced to allow passage of the page signal. A first occurring audible signalling message is thus transmittable via a selected signalling lead in the key telephone system without interference from a subsequently concurrent attempt to transmit the area page signal.

An example embodiment is described with reference to the accompanying drawings in which.

The structure and operation of the example embodiment will become apparent in the following functional description. In the description, with reference to FIG. 1, a typical intercom feature in the key telephone system is first described. Thereafter and with reference to FIGS. 1, 2 and 3 the area paging feature in the key telephone system is described.

Figure 1:
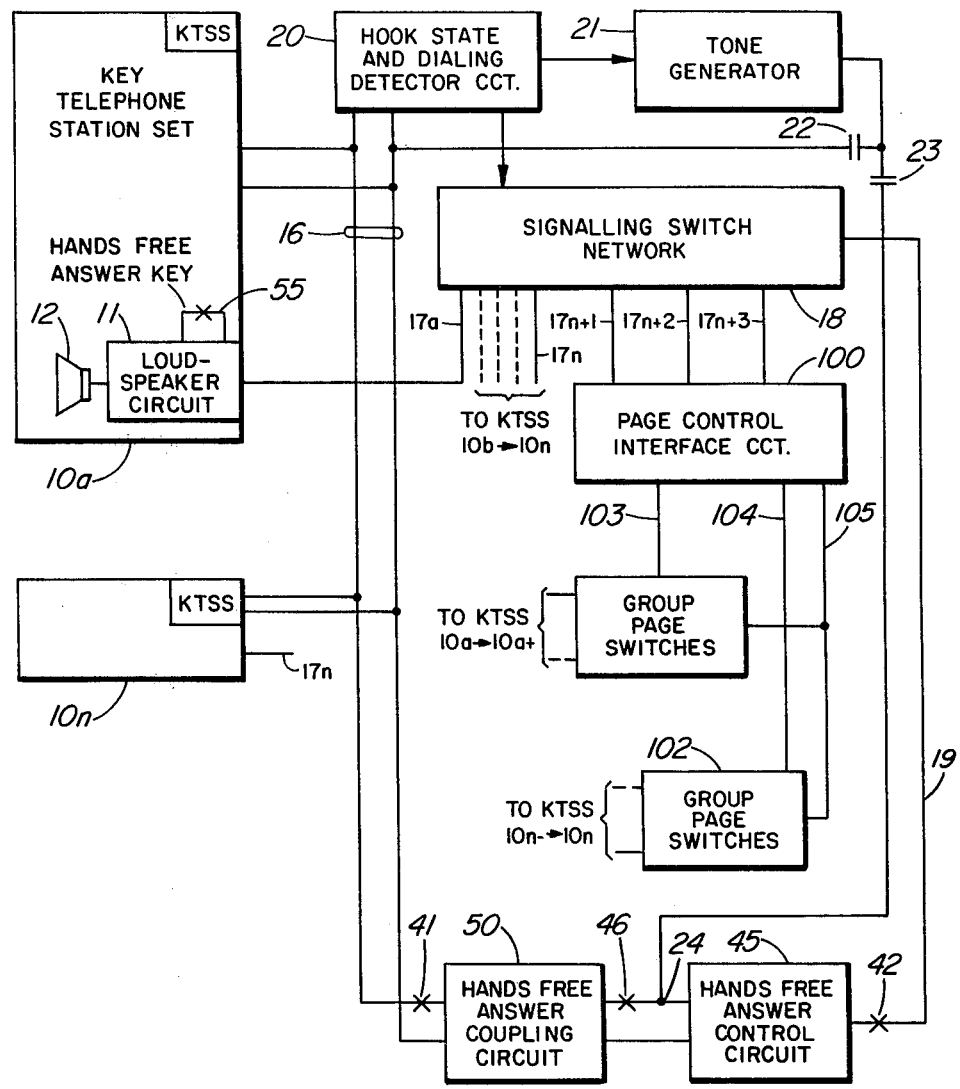
FIG. 1 is a block schematic diagram of a key telephone system having an area paging feature in accordance with the invention.

Referring to FIG. 1, the key telephone system is illustrated to show the structure as it relates to the intercom feature and the area paging feature. The key telephone system includes a plurality of key telephone station sets (KTSSs) 10a through 10n of which KTSSs 10a and 10n are shown. Each KTSS includes a loudspeaker circiut 11 connected to a loudspeaker 12. The basic function of the loudspeaker circuit 11 is to amplify signalling for audible production by the loudspeaker 12. As has been described in the previously mentioned U.S. Pat. No. 4,293,740, the loudspeaker circuit 11 is controllable to alternately function as a microphone amplifier. Each of the KTSSs 10a through 10n is associated with a plurality of communication lead pairs of which an intercom lead pair 16 is shown. Each of the KTSSs 10a–10n normally includes a handset, a hook switch, a dialling device and various switch keys including at least one intercom key, not shown. The intercom lead pair 16 is connected to a hook state and dialling detector circuit 20 which supplies the intercom lead pair with operating current. The hook state and dialling detector circuit 20 also supplies control signals to a tone generator 21 and to a signalling switch network 18. When one of the key telephone stations sets, for example 10a, goes OFF HOOK with its intercom key depressed, it is connected to the intercom lead pair and receives energizing current therefrom. A line relay, not shown in the detector circuit 20, operates in response to the flow of energizing current causing the control signals to be generated. The tone generator 21 is responsive to the control signals to generate appropriate tone signals audible to the user of a KTSS during the progress of an intercom call. The tone signals are conducted to the calling key telephone station set via a capacitor 22 and the lead pair 16 for receipt at the handset. The called party is identified by dialled digits which are detected by the hook state and dialling detector circuit 20. Dialling information is transferred to the signalling switch network 18 which accordingly provides a signalling path via a signalling port connected to one of lead pairs 17b through 17n to the called key telephone station set for coupling tone signals to its loudspeaker circuit 11. Any one of the KTSSs 10b–10n actively connected with the lead pair 16 and going OFF HOOK increases the energizing current on the lead pair 16. This increase in current is detected by the hook state and dialling detector circuit 20 which causes the tone generator 21 to be deactivated, and the signalling path in the signalling switch network 18 to be severed. Conversation between the two OFF HOOK KTSSs proceeds in a normal manner via the intercom lead pair 16.

An intercom hands free feature is provided by a hands free answer coupling circuit 50 connected between the intercom lead pair 16 and the signalling switch network 18. By this means, voice signals are transferable between the intercom lead pair 16 and a called key telephone set 10 via the signalling switch network 18 and the associated loudspeaker circuit 11. A hands free answer control circuit 45 responds to signals from the hands free answer coupling circuit 50 to generate control signals for controlling the loudspeaker circuit 11 in the called KTSS to yield transmit and receive functions. It should be noted that a selected one of the signalling paths 17a–17n is now used for three functions. The first being the previously described function of signalling, the second being the transmission of voice for the hands free answer function, and the third being the transmission of the control signals for the receive and transmit modes of operation of the loudspeaker circuit 11.

Referring to FIG. 1 in more detail, one side of the hands free answer coupling circuit 50 is coupled to the intercome lead pair 16 via a make contact 41. The other side of the hands free answer coupling circuit 50 is connected to a junction 24 by a make contact 46. The output of the tone generator 21 is also connected to the junction 24 by the capacitor 23. A signalling lead 19 is connected in series with a make contact 42 between the hands free answer control circuit 45 and the signalling switch network 18 to carry a.c. voice band signals and d.c. control signals. The relay contacts 41 and 42 are associated in operation with the line relay in the hook state and dialling detector circuit 20. The make contact 46 is associated with the hands free answer control circuit 45. With the handset in the calling KTSS 10a being OFF HOOK, the line relay is operated causing the make contacts 41 and 42 to be closed. As previously described, dialled digits cause the signalling switch network 18 to establish a communication path to the dialled one of the remaining KTSSs 10b-10n 10n. Depression of a hands free answer key 55 in the selected one of the KTSSs maintains a negative d.c. voltage on the lead 19 at a more positive potential than normal. This condition is detected by the hands free answer control circuit 45 which causes the make contact 46 to be closed. Voice signals from the calling party's handset are transmitted via a communciation path which includes the intercom leads 16, the hands free answer coupling circuit 50, the hands free answer control circuit 45, the signalling switch network 18 and one of the selected leads 17b–17n to the called KTSS. At the same time a d.c. current of about 1 milliamp is drawn from the loudspeaker circuit 11 in the called KTSS to effect control by the hands free answer control circuit 45. In the absence of significant voice band signals from the calling party's hand set, the hands free answer control circuit draws an additional 3 milliamps from the loudspeaker circuit 11, causing it to be in a transmit mode of operation. When the called KTSS goes OFF HOOK, a normal intercom connection is established over the intercom lead pair 16 with the make contacts 41, 42 and 46 being opened. At the same time the signalling switch network 18 is caused to sever the previously established communication path.

In order to provide for the area paging feature, the signalling switch network 18 includes signalling ports connected to signalling leads 17n+1, 17n+2 and 17n+3, which are in turn connected to a page control interface circuit 100. The page control interface circuit 100 provides a current path on a selected one of the signalling leads 17n+1, 17n+2, or 17n+3, and at the same time asserts a control voltage at a respective one of group page switches 101 and 102 via one of leads 103 and 104. At the same time the a.c. signals from the selected signalling lead are amplified in the page control interface circuit 100 and distributed to both of the group page switches 101 and 102 via a lead 105. The d.c. control function originating in the hands free answer control circuit 45 is in effect relayed on through the page control interface circuit 100 and the selected page switches, to activate the associated loudspeaker circuits 11 and cause audible reproduction of the voice signals from the calling party's handset.

Figure 2:
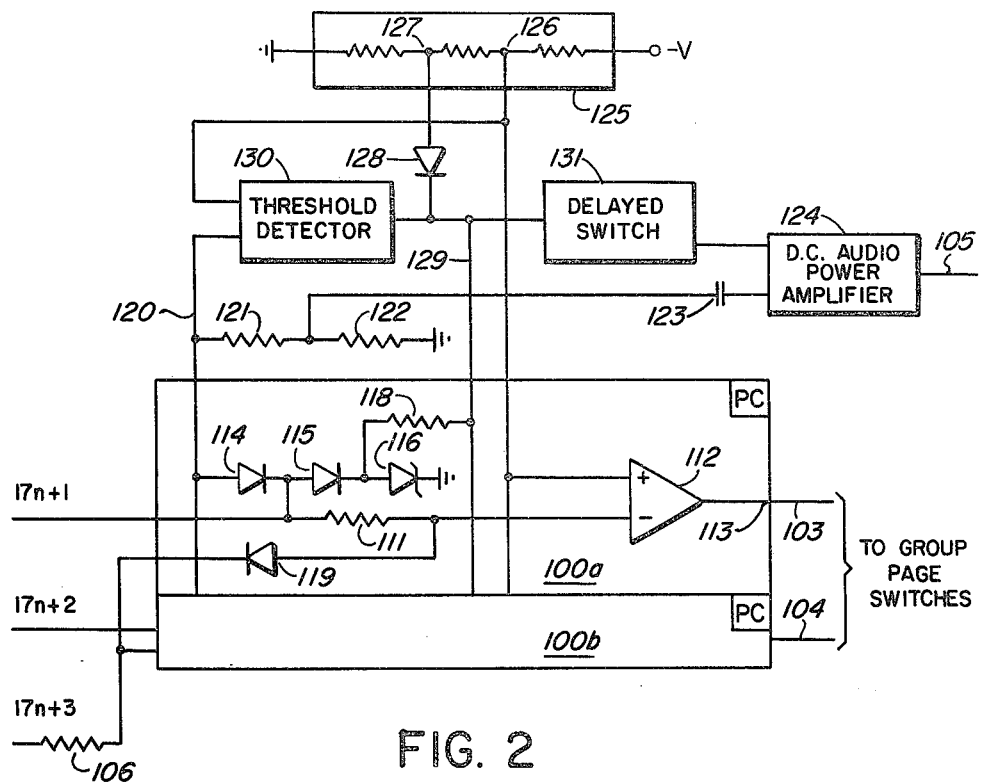
FIG. 2 is a schematic diagram of page control interface circuit used in FIG. 1.

Referring to FIG. 2, the page control interface circuit is illustrated in more detail. The page control interface circuit includes two identical page buffer circuits (PC) 100a and 100b, and a power amplifier system, for proving the a.c. signals superimposed on a d.c. voltage from a source impedance low enough to drive all the loudspeaker circuits 11 in the KTSSs. Each of the PCs includes an input, connected to a respective one of the signalling leads 17n+1 and 17n+2, and each includes an input connected in common to the signalling lead 17n+3 via an external resistor 106. Each of the page circuits also includes an output connected to a respective one of the group page switches 101 and 102. A negative voltage for example appearing on the lead 17n+1, results from the hands free answer control circuit 45 attempting to sink current from the lead 19. This causes a diode 114 in the PC 100a to be forward biased such that the required current flows from ground via resistors 122 and 121 and a lead 120. A similar diode in the PC 100b is also connected to the lead 120. AC signals from the signalling lead 17n+1 are coupled to a power amplifier 124 via a capacitor 123 which is connected between the amplifier 124 and the junction of the resistances 121 and 122. A voltage divider network 125 is connected between ground and a negative voltage supplied at −V. The voltage divider network 125 includes voltage taps 126 and 127. The voltage tap 126 is connected to a non-inverting input of a comparator 112 in each of the PCs 100a and 100b. The voltage tap 126 is also connected to a threshold detector 130 such that when a voltage on the lead 120, also connected to the threshold detector 130, is more negative than the potential at the voltage tap 126, an output of the threshold detector 130 becomes negative. In this condition, potential at the output of the threshold detector 130 is determined by a potential at the voltage tap 127 which is connected in series with a diode 128. The cathode of the diode 128 is also connected to a resistor 116 in each of the PCs 100a and 100b via a lead 129, and to an input of a delayed switch 131. The delayed switch 131 responds to a transition from ground to the negative potential by causing the power amplifier 124 to be active a predetermined time later. This delay is arranged to be an appropriate length for switching operations to be complete, such that any resulting noise signals are substantially prevented from appearing at an output of the power amplifier 124, on the lead 105. When in an active state, the power amplifier 124 amplifies a.c. signals received through the capacitor 123, to generate a d.c. biased voltage signal. This signal comprises a.c. voltage signals, corresponding to the received a.c. signals, superimposed on a predetermined negative voltage. The potential of the predetermined negative voltage is determined by a network, not shown, in the amplifier 124. The d.c. biased voltage signal is distributed on the lead 105 and is at a potential sufficient to cause each of the loudspeaker circuit 11 receiving it to be in the receive mode of operation, as will be described later.

In each of the PCs 100a and 100b, a protection network including a diode 115 connected in series with a Zener diode 116, is connected between ground and the respective signalling lead, in order to limit any positive voltage spikes which may be induced on the respective signalling lead. A resistor 118 couples the potential of the lead 129 to the junction of the diodes 115 and 116 so that they are both reverse biased when one of the PCs 100a and 100b is active. In PC 100a the signalling lead 17n+1 is connected in series with a resistor 111 to an inverting input of the comparator 112. Likewise the signalling lead 17n+2 is connected to the corresponding comparator in the PC 100b. When the potential on a signalling lead 17n+1 or 17n+2 becomes more negative than the potential of the voltage tap 126, the corresponding comparator output changes from a negative potential to a near ground potential, to activate the respective group of page switches. The inverting input of the comparator 112 is also connected via a diode 119 to the resistor 106, such that a negative voltage on the lead 17n+3 causes each of the comparators 112 to have outputs of near ground potential to activate both 101 and 102 group page switches at the same time.

Figure 3:
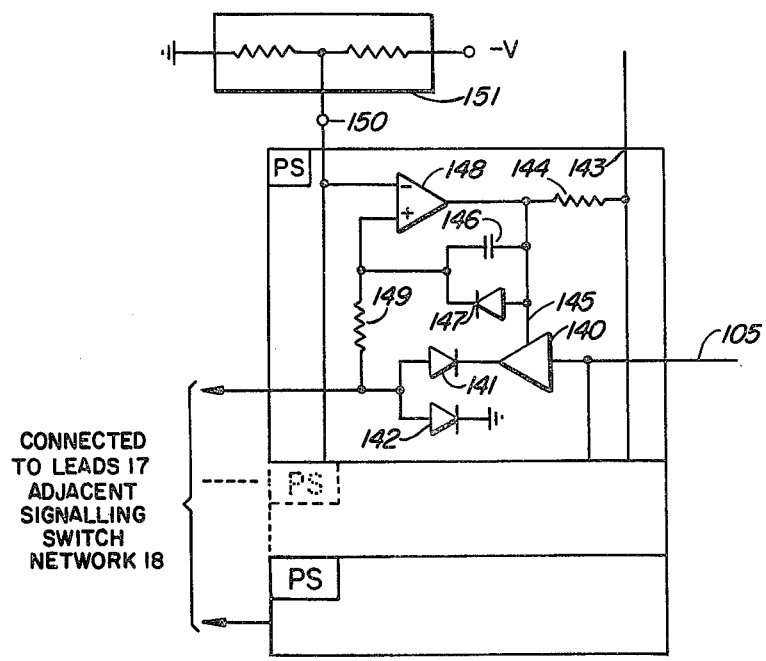
FIG. 3 is a schematic diagram of one page switch in a group of page switches used in FIG. 1.

Referring to FIG. 3 a group of page switches (PS) is connected with one of the page circuits 100a and 100b, via a control port 143. Each of the page switches includes a transmission gate 140 having an input connected to the lead 105 and an output connected in current aiding series relationship with a diode 141 to a predetermined one of the signalling leads 17a–17n, in FIG. 1. The signalling leads 17a–17n each consist of a driven lead and a ground return lead in a twisted pair arrangement. In each case connection is to the driven lead and usually physically adjacent the signalling switch network 18. A diode 142 is connected in a normally current blocking series relationship between the cathode of the diode 141 and ground. The diodes 141 and 142 provide for protection against induced voltage spikes which would otherwise possibly damage the transmission gate 140. A resistor 144 is connected in series between the control port 143 and a control terminal 145 of the transmission gate 140. In operation a negative control voltage at the control pot 143 is conducted via the resistor 144 to the control terminal 145, causing the transmission gate to have an impedance sufficient to block signals on the lead 105. When the voltage at the control terminal 145 is allowed to approach ground, the transmission gate 140 passes the d.c. biased voltage signal on the lead 105, by providing a low impedance path to the associated lead 17 via the diode 141.

A logic circuit includes a capacitor 146, a diode 147 a comparator 148 and a resitance 149, connected as shown. In this example the comparator 148 is characterized by an open collector output which effectively utilizes the resistor 144 as a load resistor. The logic circuit functions to prevent the transmission gate 140 from becoming conductive in the event that the associated lead 17 is already busy as a result of an in progress intercom loudspeaker call originating from a second intercom circuit not shown. The busy signalling lead 17 must necessarily be of a negative potential in order that the associated loudspeaker circuit 11 be operative, as is described in the previously mentioned U.S. Pat. No. 4,293,740. This aspect of operation in the key telephone system is utilized at the comparator 148 to hold the control terminal 145 at a negative potential. However in the case where the lead 17 is in an idle state, that is, at a near ground potential, and the output of the comparator 148 is at a similar potential due to the potential of the control port 143, a near ground potential is then coupled by the diode 147 to the non inverting input of the comparator 148 thus preventing the subsequently appearing negative voltage from the output of the transmission gate 140 from having any effect in the page switch.

The following sequential logic table further demonstrates the operation of each of the page switches.

| CONTROL PORT | OUTPUT TERMINAL | GATE 140 IMPEDANCE |
|---|---|---|
| −Volts | 0 Volts | HIGH |
| −Volts | −Volts | HIGH |
| −Volts to 0 Volts | −Volts | HIGH |
| −Volts to 0 Volts | 0 Volts to −Volts | LOW |
| 0 Volts | −Volts to 0 Volts to −Volts | HIGH TO LOW |

What is claimed is:

1. An area voice paging circuit for use in a key telephone system wherein a signalling switch network, having signalling ports, provides for connection of a.c. voice band signals and d.c. control signals to loudspeaker circuits each being selectable via a respective one of the signalling ports, and each residing in an associated key telephone station set, the area voice paging circuit comprising:
a page control interface circuit for generating a page signal in response to receipt of the d.c. control signals via the signalling switch network, and for generating a d.c. biased voltage signal which includes an a.c. voltage signal corresponding to the a.c. voice band signals, the a.c. voltage signal being superimposed on a predetermined d.c. voltage;
a plurality of page switches each having an output terminal connected in common with one of a plurality of the signalling ports, the page switches being responsive to an assertion of the page signal from the page control interface circuit for coupling the d.c. biased voltage signal from the page control interface circuit to the respective signalling ports for use in the associated loudspeaker circuits; and wherein the page control interface circuit comprises:
a plurality of page buffer circuits each having a signal input for receiving the d.c. control signal from one of the signalling ports, a page signal output, a unidirectional current path connected to the signal input, and a comparator with inputs, one input being connected to receive a reference voltage and another input being connected in series with a resistance to the signal input, the comparator being responsive to the d.c. control signal exceeding the reference voltage for generating the page signal at the page signal output;
an amplifier system including a resistive input connected to the unidirectional current path in each of the plurality of page buffer circuits, a power amplifier for amplifying the a.c. voice band signals appearing across the resistive input to generate the d.c. biased voltage signal at an output of the power amplifier, in response to an amplifier control signal, and a threshold detector for generating the amplifier control signal in response to more than a predetermined d.c. voltage appearing across the resistive input.

2. An area voice page circuit as defined in claim 1 wherein each of the plurality of page switches comprises:
a control port for receiving the page signal;
a transmission gate having input, output, and control terminals, the input terminal being connected to the output of the power amplifier, the output terminal being connected in common with a respective one of the signalling ports, and the control terminal being connected in series with a resistance to the control port, the transmission gate being responsive to a control signal at the control terminal for passing signals from the input terminal to the output terminal; and
a voltage comparator with an output and inputs, one input being connected to a reference voltage terminal for receiving a reference voltage, and another input being connected in series with a resistor to the output terminal and in series with a diode to the control terminal, the output being connected to a junction between the diode and the control terminal, whereby the transmission gate is maintained non responsive to an assertion of the page signal in a case where the d.c. control voltage from the associated signalling port is already present at the output of the page switch.

3. An area voice paging circuit for use in a key telephone system wherein a signalling switch network, having signalling ports, provides for connection of a.c. voice band signals and d.c. control signals to loudspeaker circuits each being selectable via a respective one of the signalling ports, and each residing in an associated key telephone station set, the area voice paging circuit comprising:
a page control interface circuit for generating a page signal in response to receipt of the d.c. control signals via the signalling switch network, and for generating a d.c. biased voltage signal which includes an a.c. voltage signal corresponding to the a.c. voice band signals, the a.c. voltage signal being superimposed on a predetermined d.c. voltage;
a plurality of page switches each having an output terminal connected in common with one of a plurality of the signalling ports, the page switches being responsive to an assertion of the page signal from the page control interface circuit for coupling the d.c. biased voltage signal from the page control interface circuit to the respective signalling ports for use in the associated loudspeaker circuits; and
wherein each of the plurality of page switches comprises:
a signal transmission gating circuit for passing the d.c. biased voltage signals to a respective one of the signalling ports in response to the page signal occurring in the absence of a d.c. control voltage having been supplied to the signalling port prior to the occurrence of an instant page signal;
whereby an a.c. voice band signal being directed to one of the loudspeaker circuits via the signalling switch network is maintained in preference to a subsequent occurring d.c. biased voltage signal from the area voice page circuit.

4. A transmission gating circuit for use in an area paging circuit in a key telephone system wherein a signalling switch network is coupled via signalling ports connected with signalling lines to respective key telephone station sets, a plurality of the transmission gating circuits being connected between respective ones of the signalling ports and an area paging controller, each of the transmission gating circuits comprising:
a transmission gate having input, output and control terminals and being responsive to a d.c. control voltage at the control terminal to provide a transmission path between the input and output terminals;

a logic circuit connected to the output terminal, the control terminal and to a control port, the logic circuit being responsive to a d.c. control voltage being asserted at the control port to pass the d.c. control voltage to the control terminal, except in an instant where a d.c. voltage exceeding a predetermined potential is present at the output terminal prior to assertion of the d.c. control voltage at the control port.

5. A transmission gating circuit as defined in claim 4 wherein the logic circuit comprises:

a voltage comparator having inputs, one being connected to a reference voltage terminal and another being connected in series with a resistance to the output terminal and in series with a diode to the control terminal, and an output being connected to a junction between the diode and the control terminal; and a resistance connected in series between said junction and the control port.

6. A method for performing an area page across a group of loudspeaker circuit equipped key telephone station sets in a key telephone system wherein individual ones of the loudspeaker circuits are activated in response to a predetermined d.c. signal on respective ones of signalling lines, the method comprising the steps of:

(a) applying area paging signals including a voice band signal and a d.c. control signal to a group of transmission gates;

(b) asserting a page control signal to cause each transmission gate to pass the area paging signal to the respective signalling lead; and at each transmission gate, (c) comparing a signal state in the associated signalling lead with a predetermined reference voltage, to determine if the signalling lead is busy; and (d) in response to a busy determination in step (c) occurring prior to an occurrence of step (b), maintaining the transmission gate at a higher impedance than that required to pass the area page signal, whereby a first occurring audible signalling message being transmitted to a selected key telephone station set in the key telephone system is maintained separate from a subsequent concurrent wide area paging signal.

* * * * *